United States Patent
Kawano

(10) Patent No.: US 10,967,701 B2
(45) Date of Patent: Apr. 6, 2021

(54) AIR CONDITIONER

(71) Applicant: DENSO CORPORATION, Kariya (JP)

(72) Inventor: Shigeru Kawano, Kariya (JP)

(73) Assignee: DENSO CORPORATION, Kariya (JP)

( * ) Notice: Subject to any disclaimer, the term of this patent is extended or adjusted under 35 U.S.C. 154(b) by 366 days.

(21) Appl. No.: 16/090,837

(22) PCT Filed: Mar. 31, 2017

(86) PCT No.: PCT/JP2017/013504
§ 371 (c)(1),
(2) Date: Oct. 3, 2018

(87) PCT Pub. No.: WO2017/175669
PCT Pub. Date: Oct. 12, 2017

(65) Prior Publication Data
US 2020/0324612 A1    Oct. 15, 2020

(30) Foreign Application Priority Data

Apr. 5, 2016  (JP) .............................. JP2016-075908

(51) Int. Cl.
*B60H 1/00*  (2006.01)
(52) U.S. Cl.
CPC ..... *B60H 1/00064* (2013.01); *B60H 1/00285* (2013.01); *B60H 2001/00121* (2013.01)
(58) Field of Classification Search
CPC ........... B60H 1/00064; B60H 1/00285; B60H 2001/00121; F24F 1/02; F24F 13/30
See application file for complete search history.

(56) References Cited

U.S. PATENT DOCUMENTS

| 9,004,993 | B2 * | 4/2015 | Fujii | B60H 1/00285 454/120 |
| 2001/0004008 | A1 * | 6/2001 | Aoki | B60H 1/00285 165/43 |
| 2015/0056906 | A1 * | 2/2015 | Fujii | B60N 2/5657 454/75 |

FOREIGN PATENT DOCUMENTS

| JP | S44016911 Y1 | 7/1969 |
| JP | H05256472 A | 10/1993 |
| JP | H06050564 A | 2/1994 |

* cited by examiner

*Primary Examiner* — Emmanuel E Duke
(74) *Attorney, Agent, or Firm* — Harness, Dickey & Pierce, P.L.C.

(57) ABSTRACT

An air conditioner includes a blower unit, a blowing duct, and an air switching portion. The blower unit is configured to blow cold air and warm air simultaneously. The blowing duct includes a target blowing portion through which air is sent to a space that is an air-conditioning target, and a non-target blowing portion through which the air is sent to a space that is not an air-conditioning target. The air switching portion is configured to switch between a cold air supply state in which the cold air is sent to the target blowing portion while the warm air is sent to the non-target blowing portion, and a warm air supply state in which the warm air is sent to the target blowing portion while the cold air is sent to the non-target blowing portion.

3 Claims, 6 Drawing Sheets

AIR CONDITIONER

CROSS REFERENCE TO RELATED APPLICATIONS

This application is a U.S. National Phase Application under 35 U.S.C. 371 of International Application No. PCT/JP2017/013504 filed on Mar. 31, 2017. This application is based on and claims the benefit of priority from Japanese Patent Application No. 2016-075908 filed on Apr. 5, 2016. The entire disclosures of all of the above applications are incorporated herein by reference.

TECHNICAL FIELD

The present disclosure relates to an air conditioner.

BACKGROUND ART

As one form of an air conditioner, there is an integrated air conditioner in which a condenser, an evaporator, and a compressor are provided in one body. The integrated air conditioner disclosed in Patent Document 1 includes an indoor heat exchanger arranged on the indoor side and an outdoor heat exchanger arranged on the outdoor side. In the summer season, the refrigeration cycle is operated so that the indoor heat exchanger functions as an evaporator and the outdoor heat exchanger functions as a condenser. In contrast, in the winter season, the refrigeration cycle is operated so that the indoor heat exchanger functions as a condenser and the outdoor heat exchanger functions as an evaporator.

PRIOR ART DOCUMENT

Patent Document

Patent Document 1: JP H6-59564 A

SUMMARY OF THE INVENTION

In Patent Document 1, air-conditioning is performed by switching a flow of the refrigerant in the refrigeration cycle by a switching valve provided in the refrigerant passage. According to this, since the configuration of the device may be complicated and a large switching valve may be needed, the air conditioner cannot be downsized.

It is an object of the present disclosure to provide an air conditioner that can be downsized while a refrigeration cycle is accommodated in one body portion and a cooling-heating function can be exerted.

According to the present disclosure, an air conditioner includes: a blower unit configured to blow cold air and warm air simultaneously; a blowing duct including a target blowing portion through which air is sent to a space that is an air-conditioning target, and a non-target blowing portion through which the air is sent to a space that is not an air-conditioning target; and an air switching portion configured to switch the airs sent to the target blowing portion and the non-target blowing portion. The air switching portion is configured to switch between the cold air supply state and the warm air supply state. In the cold air supply state, the cold air is sent to the target blowing portion, and the warm air is sent to the non-target blowing portion. In the warm air supply state, the warm air is sent to the target blowing portion, and the cold air is sent to the non-target blowing portion.

According to the present disclosure, the cold air supply state and the warm air supply state are switched by the air switching portion without changing the state of cold air and the warm air blown by the blower. Therefore, it is not necessary to provide a switching valve in the refrigerant flow path to change the flow of the refrigerant, for example, and it is possible to switch between cold air and warm air appropriately with a simple configuration.

EMBODIMENTS FOR EXPLOITATION OF THE INVENTION

Figure 1:
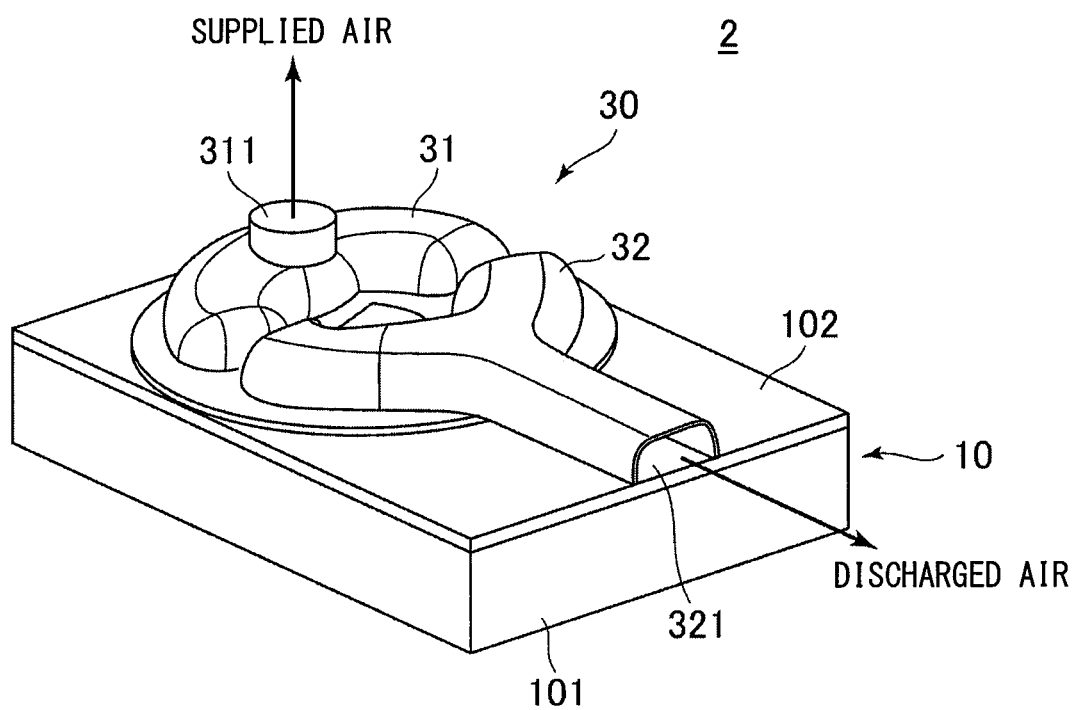
FIG. 1 is a perspective diagram illustrating an air conditioner according to an embodiment.

Hereinafter, an embodiment will be described with reference to the attached drawings. In order to facilitate the ease of understanding, the same reference numerals are attached to the same constituent elements in each drawing where possible, and redundant explanations are omitted.

An air conditioner 2 of the present embodiment will be described with reference to FIG. 1. The air conditioner 2 is provided under a seat of a vehicle and used for cooling and heating a vicinity of the seat in the vehicle, for example. As shown in FIG. 1, the air conditioner 2 includes a blower 10 and a blowing duct 30. The blower 10 has a body portion 101 and an opening plate 102. The opening plate 102 is provided between the body portion 101 and the blowing duct 30.

The blowing duct 30 has a target blowing portion 31 for supplying air to a vehicle compartment that is an air conditioning target and a non-target blowing portion 32 for discharging air to an outside of the vehicle compartment. The target blowing portion 31 includes an air supply port 311. The non-target blowing portion 32 includes an air discharge port 321.

Figure 2:
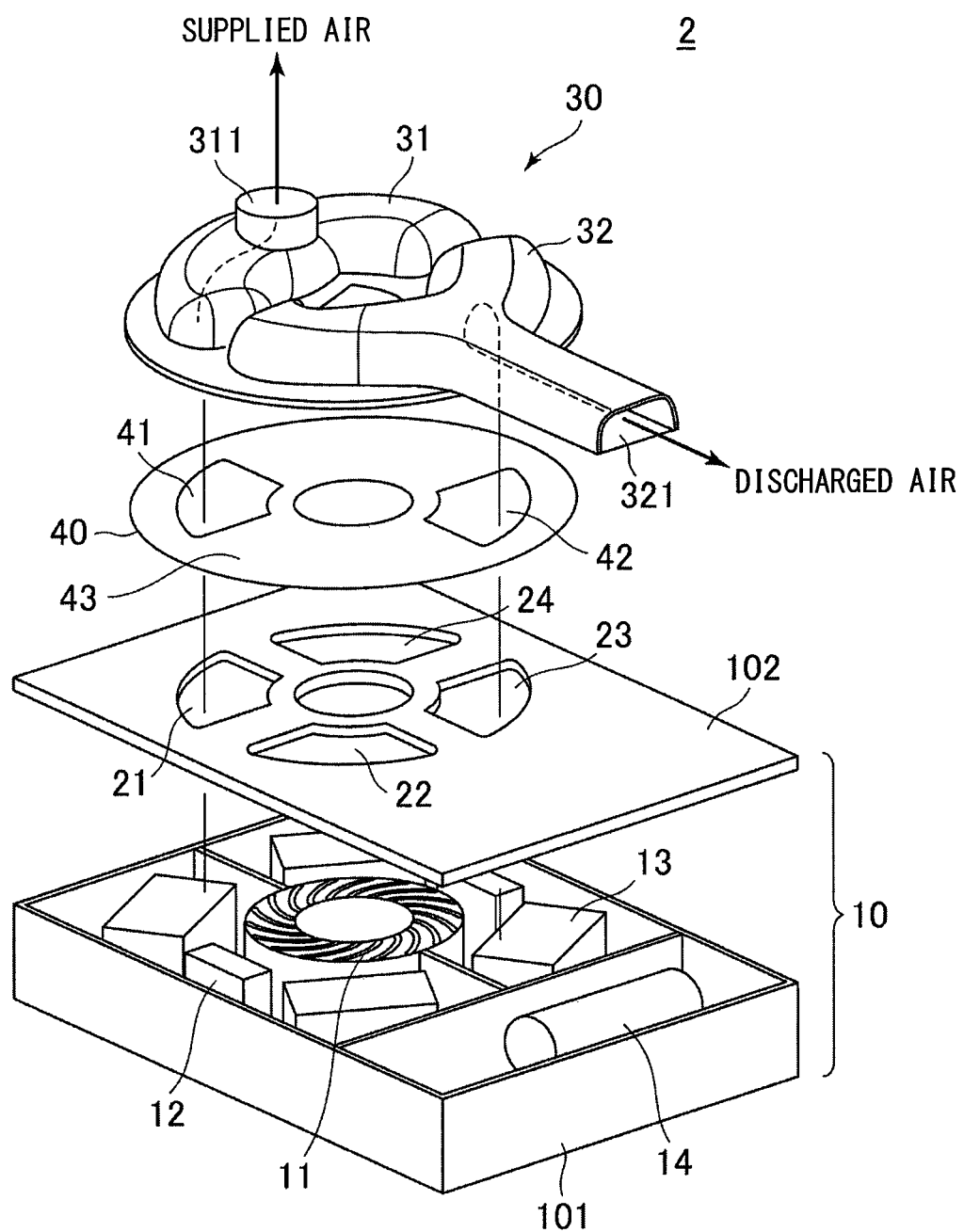
FIG. 2 is an exploded perspective diagram illustrating the air conditioner according to the embodiment.

The description will be continued with reference to FIG. 2. As shown in FIG. 2, the body portion 101 accommodates a centrifugal fan 11, a condenser 12, an evaporator 13, and a compressor 14. The condenser 12, the evaporator 13, and the compressor 14 constitute a refrigeration cycle. As the centrifugal fan 11 rotates, air passes through the condenser 12 and the evaporator 13, and warm air or cold air are supplied.

The opening plate 102 is configured to close an upper opening of the body portion 101. The opening plate 102 has a flat plate shape. The opening plate 102 is provided with warm air openings 21, 22 and cold air openings 23, 24. The warm air openings 21, 22 and the cold air openings 23, 24 surround the air supply port of the centrifugal fan 11 and each has an arc shape. The warm air openings 21, 22 are positioned near the condenser 12. The cold air openings 23, 24 are positioned near the evaporator 13.

An air switching portion 40 is provided between the opening plate 102 and the blowing duct 30. The air switching portion 40 has a disk shape. The air switching portion 40 is provided with a pair of opening portions 41, 42. The opening portion 41 and the opening portion 42 are provided so as to opposite from each other across a rotation center of the air switching portion 40. Each of the openings 41, 42 has an arc shape. In the air switching portion 40, portions other than the opening portions 41, 42 are formed as a closing portion 43.

Figure 3:
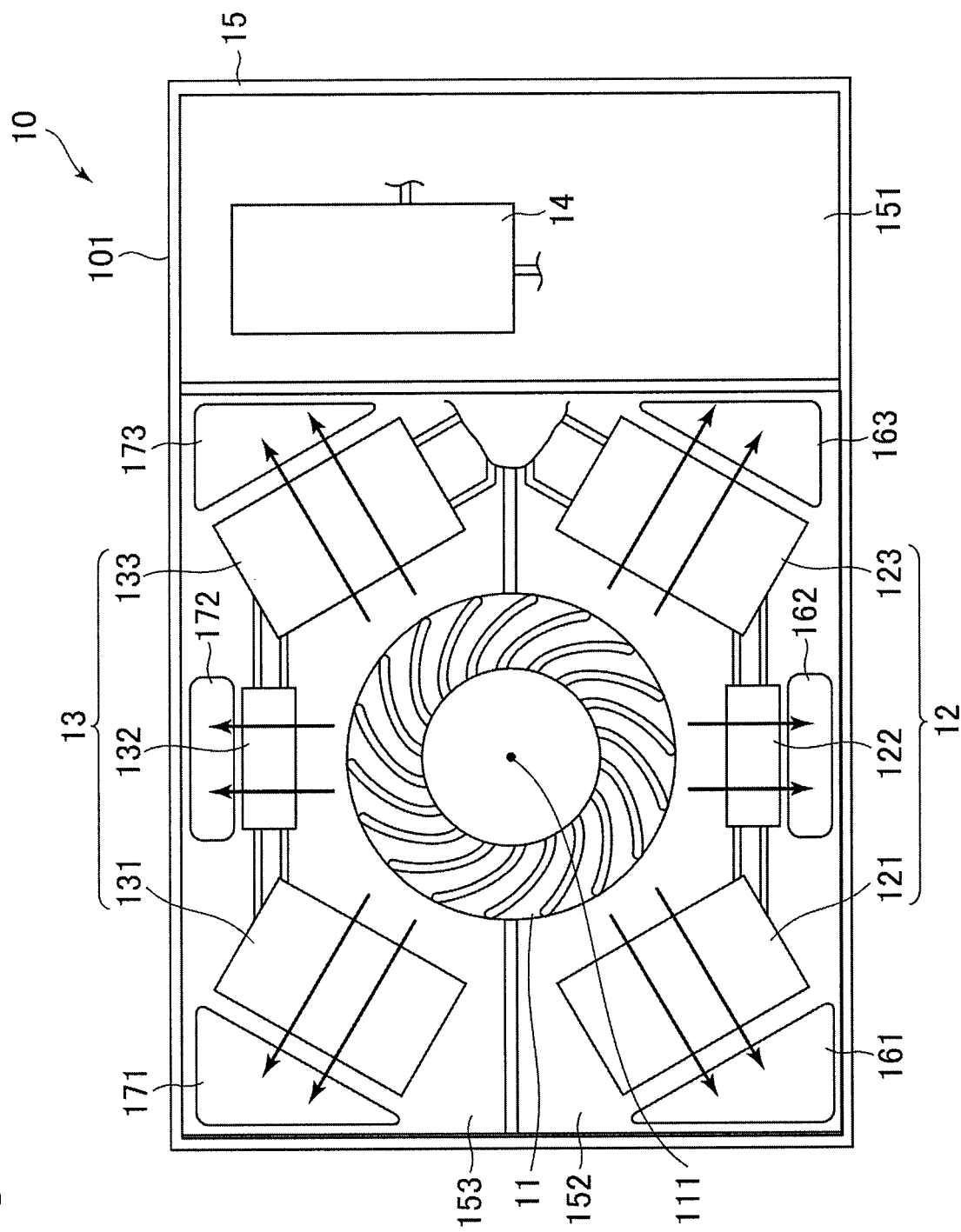
FIG. 3 is a plan view illustrating an internal structure of a blower shown in FIGS. 1 and 2.

The body portion 101 will be described with reference to FIG. 3. The body portion 101 has a body casing 15. The body casing 15 is partitioned into three sections, i.e. a compressor section 151, a condenser section 152, and an evaporator section 153. The compressor 14 is provided in the compressor section 151.

The condenser section 152 and the evaporator section 153 are adjacent to each other. The centrifugal fan 11 is disposed so as to extend across the condenser section 152 and the evaporator section 153. A center 111 of the centrifugal fan 11 is located on a boundary between the condenser section 152 and the evaporator section 153.

The condenser 12 is provided in the condenser section 152. The condenser 12 includes partial condenser portions 121, 122, 123. Each of the partial condenser portions 121, 122, 123 is configured to function as a heat exchanger and is connected to each other through refrigerant pipes. The partial condenser portions 121, 122, and 123 are arranged in the condenser section 152 so as to surround a half of a circumference of the centrifugal fan 11.

The evaporator 13 is disposed in the evaporator section 153. The evaporator 13 has partial evaporator portions 131, 132, 133. Each of the partial evaporator portions 131, 132, 133 is configured to function as a heat exchanger and is connected to each other through refrigerant pipes. The partial evaporator portions 131, 132, and 133 are arranged in the evaporator section 153 so as to surround a half of the circumference of the centrifugal fan 11.

When the centrifugal fan 11 rotates, air is blown out in a radial direction. The air blown out from the centrifugal fan 11 flows through each of the partial condenser portions 121, 122, 123 in the condenser section 152. The air that has passed through the partial condenser portions 121, 122, 123 and has become warm air flows through warm air space 161, 162, 163. The warm air having passed through the warm air space 161, 162, 163 is directed to the warm air openings 21, 22 of the opening plate 102.

The air blown out from the centrifugal fan 11 flows through each of the partial evaporator portions 131, 132, 133 in the evaporator section 153. The air that has passed through the partial evaporator portions 131, 132, 133 and has become cold air flows through cold air space 171, 172, 173. The cold air having passed through the cold air space 171, 172, 173 is directed to the cold air openings 23, 24 of the opening plate 102.

Returning to FIG. 2, explanation will be continued. In a condition shown in FIG. 2, the air switching portion 40 is provided on the opening plate 102 such that the opening portion 41 overlaps the warm air opening 21 and the opening portion 42 overlaps the cold air opening 23. The warm air opening 22 and the cold air opening 24 are closed by the closing portion 43. Accordingly, the warm air directed toward the warm air opening 21 passes through the opening portion 41 toward the blowing duct 30, and the cold air directed toward the cold air opening 23 passes through the opening portion 42 toward the blowing duct 30.

Figure 4:
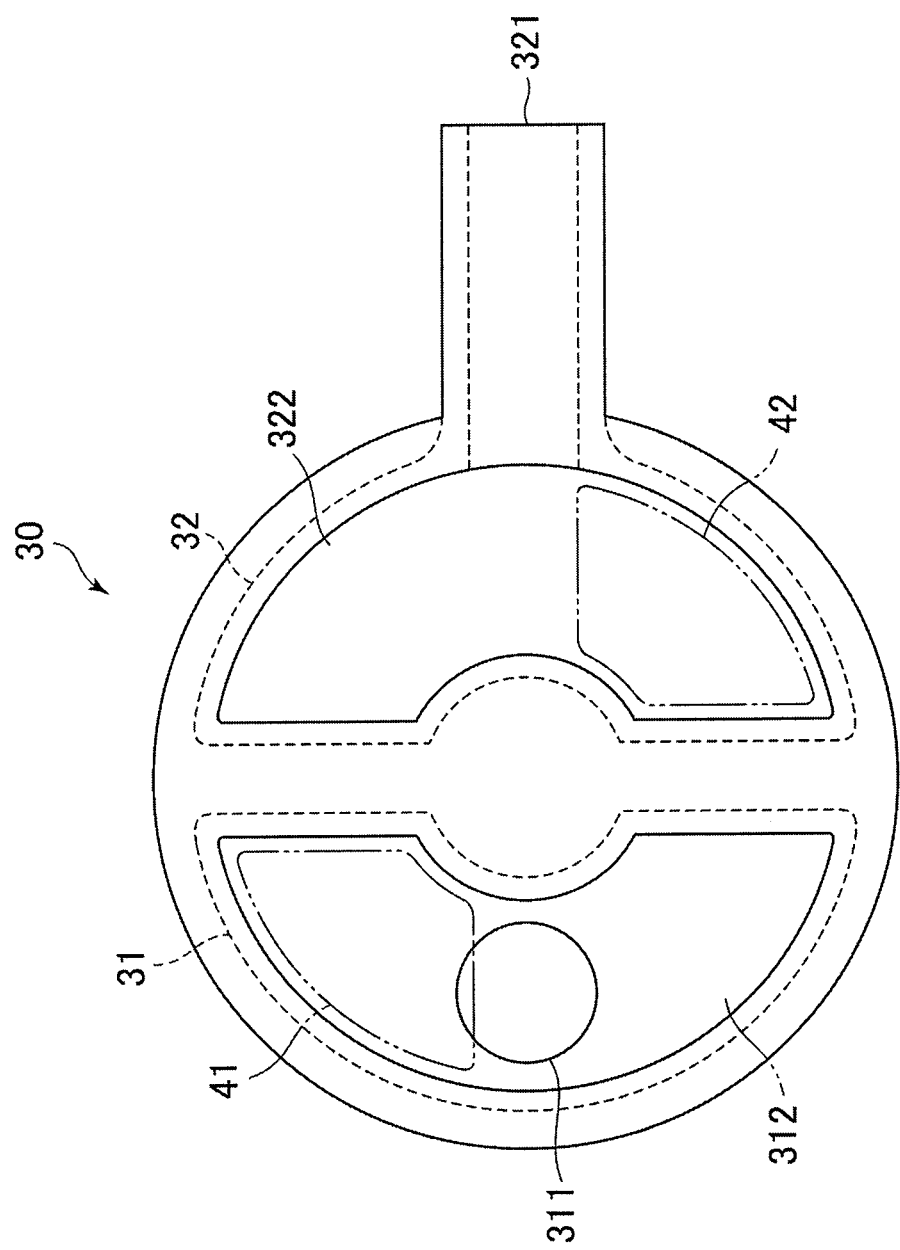
FIG. 4 is a rear view illustrating a blowing duct shown in FIGS. 1 and 2.

The relationship between the air switching portion 40 and the blowing duct 30 will be described with reference to FIG. 4. FIG. 4 shows a state in which the blowing duct 30 is viewed from the air switching portion 40 side. An air supply passage 312 is connected to the air supply port 311. The air supply passage 312 opens on the air switching portion 40 side and has a substantially semicircular shape. An air discharge passage 322 is connected to the air discharge port 321. The air discharge passage 322 opens on the air switching portion 40 side and has a substantially semicircular shape.

In a positional relationship shown in FIG. 2, the opening portion 41 through which the warm air passes overlaps the air supply passage 312. Accordingly, the warm air is blown out from the air supply port 311. On the other hand, the opening portion 42 through which the cold air passes is overlaps the air discharge passage 322. Accordingly, the cold air is blown out from the air discharge port 321.

Figure 5:
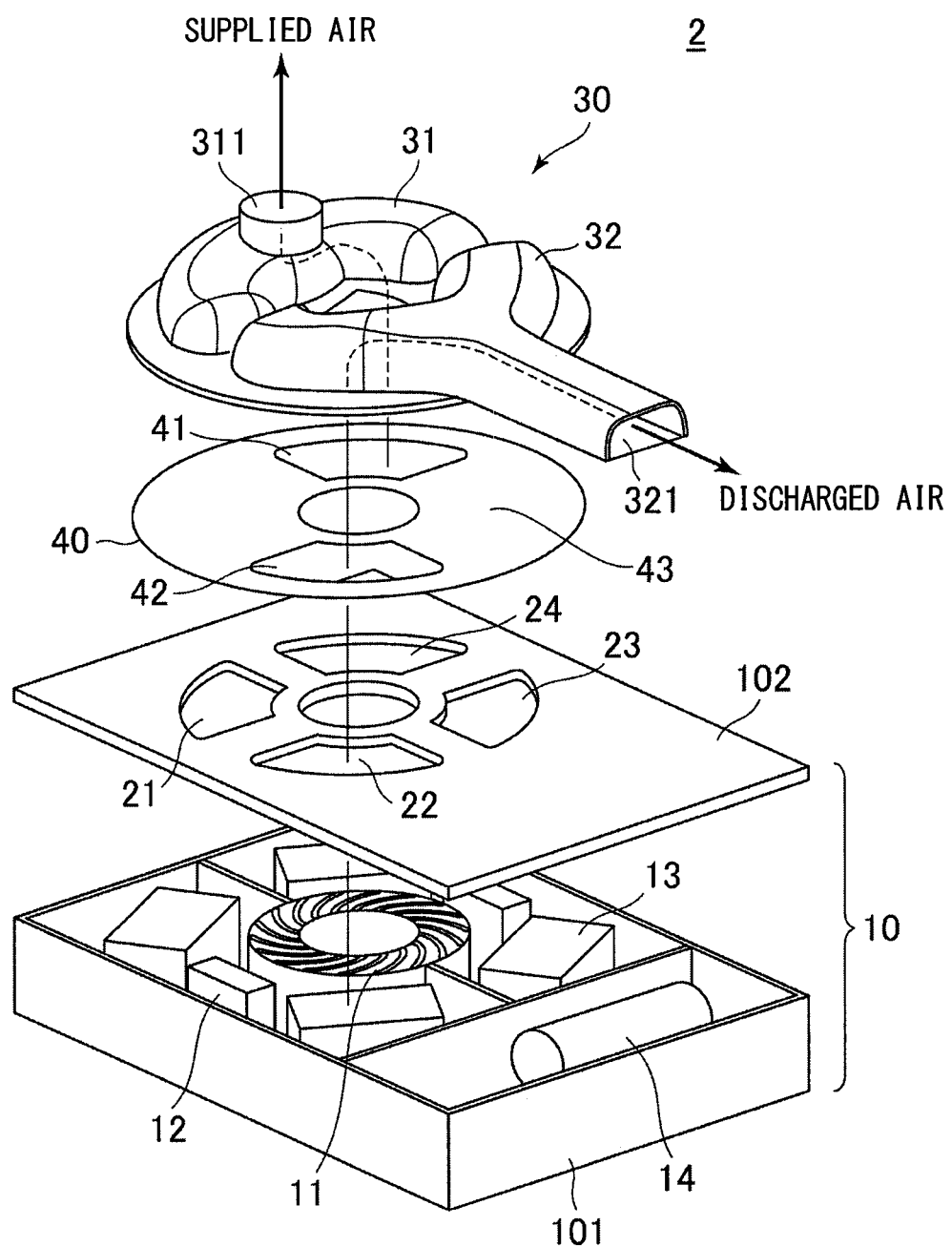
FIG. 5 is an exploded perspective diagram illustrating the air conditioner according to the embodiment.

Subsequently, a state in which the air switching portion 40 is rotated by 90 degrees from the position shown in FIG. 2 will be described with reference to FIG. 5. In a condition shown in FIG. 5, the air switching portion 40 is positioned on the opening plate 102 such that the opening portion 41 overlaps the cold air opening 24 and the opening portion 42 overlaps the warm air opening 22. The warm air opening 21 and the cold air opening 23 are closed by the closing portion 43. Accordingly, the warm air directed toward the warm air opening 22 passes through the opening portion 42 toward the blowing duct 30, and the cold air directed toward the cold air opening 24 passes through the opening portion 41 toward the blowing duct 30.

Figure 6:
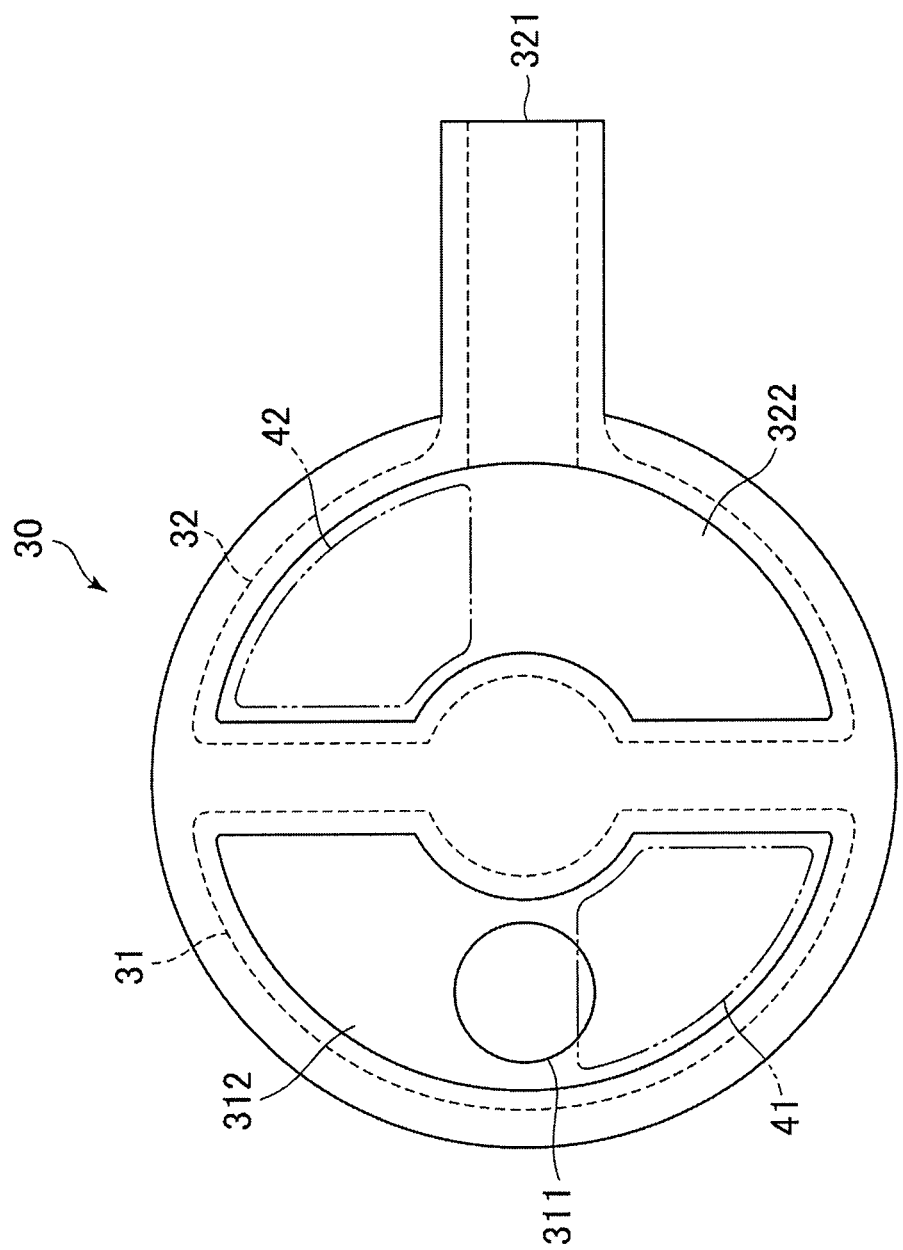
FIG. 6 is a rear view illustrating the blowing duct shown in FIGS. 1 and 2.

The relationship between the air switching portion 40 and the blowing duct 30 will be described with reference to FIG. 6. FIG. 6 shows a state in which the blowing duct 30 is viewed from the air switching portion 40 side. In a positional relationship shown in FIG. 5, the opening portion 42 through which the warm air passes overlaps the air discharge passage 322. Accordingly, the warm air is blown out from the air discharge port 321. On the other hand, the opening portion 41 through which the cold air passes overlaps the air supply passage 312. Accordingly, the cold air is blown out from the air supply port 311.

As described above, when the arrangement of the air switching portion 40 with respect to the opening plate 102 is the arrangement as shown in FIG. 2, a warm air supply state is established in which the warm air is blown out from the air supply port 311. When the arrangement of the air switching portion 40 with respect to the opening plate 102 is the arrangement as shown in FIG. 5, a cold air supply state is established in which the cold air is blown out from the air supply port 311.

As described above, the air conditioner 2 according to the present embodiment includes: the blower 10 configured to blow out the cold air and the warm air simultaneously; the blowing duct 30 that has the target blowing portion 31 through which the air is sent to the air-conditioning target space, and the non-target blowing portion 32 through which the air is sent to a space different from the air-conditioning target space; and the air switching portion 40 configured to switch the air sent to the target blowing portion 31 and the non-target blowing portion 32.

The air switching portion 40 is configured to switch between the cold air supply state and the warm air supply state. In the cold air supply state, the cold air is sent to the target blowing portion 31, and the warm air is sent to the non-target blowing portion 32. In the warm air supply state, the warm air is sent to the target blowing portion 31, and the cold air is sent to the non-target blowing portion 32.

In the present embodiment, the cold air supply state and the warm air supply state are switched by the air switching portion 40 without changing the states of cold air and the warm air blown by the blower 10. Therefore, it is not necessary to provide a switching valve in the refrigerant flow path to change the flow of the refrigerant, for example, and it is possible to switch between cold air and warm air appropriately.

Further, in the present embodiment, the blower 10 includes the evaporator 13 and the condenser 12 which constitute the refrigeration cycle. The air passes through the evaporator 13 evaporating the refrigerant, and thus the cold air is provided. The air passes through the condenser 12 condensing the refrigerant, and thus the warm air is provided.

In the present embodiment, the air switching portion 40 is configured to provide the cold air supply state, where the cold air is sent to the target blowing portion 31, by providing a communication between the evaporator 13 and the target blowing portion 31 and by interrupting a communication between the evaporator 13 and the non-target blowing portion 32. In the cold air supply state, the warm air is sent to the non-target blowing portion 32 by providing a communication between the condenser 12 and the non-target blowing portion 32 and by interrupting a communication the condenser 12 and the target blowing portion 31.

The air switching portion 40 allows the cold air to flow into the non-target blowing portion 32 by opening a path between the evaporator 13 and the non-target blowing portion 32 and by closing a path between the evaporator 13 and the target blowing portion 31. In this case, the air switching portion 40 provides the warm air supply state by opening the path between the condenser 12 and the target blowing portion 31 and by closing the path between the condenser 12 and the non-target blowing portion 32. In the warm air supply state, the warm air is sent to the target blowing portion 31.

By moving the air switching portion 40 as described above, the cold air supply state and the warm air supply state can be switched. As described above, the cold air and the warm air supplied to the target blowing portion 31 can be switched with a simple system in which the opening state and the closing state of the paths between the condenser 12, the evaporator 13, and the target blowing portion 31 are switched using the air switching portion 40.

Further, in the present embodiment, the blower 10 has the opening plate 102 provided with the cold air openings 23, 24 through which the cold air supplied from the evaporator 13 is blown out and the warm air openings 21, 22 through which the warm air supplied from the condenser 12 is blown out. The air switching portion 40 includes the opening portions 41, 42, and the closing portion 43. The target blowing portion 31 and the non-target blowing portion 32 communicate through the opening portions 41, 42 with a space in which the evaporator 13 is provided or a space in which the condenser 12 is provided. The closing portion 43 interrupts the communication between the target blowing portion 31, the non-target blowing portion 32, the evaporator 13, and the condenser 12.

With such a configuration, when one of the open portions 41, 42 overlaps with the cold air openings 23, 24, the cold air can pass through the one. When the other of the open portions 41, 42 overlaps with the warm air openings 21, 22, the warm air can pass through the other one. Since the openings 41, 42 are located so as to communicate with either the target blowing portion 31 or the non-target blowing portion 32, the warm air is discharged through the non-target blowing portion 32 when the cold air is supplied to the target blowing portion 31. In contrast, when the warm air is supplied to the target blowing portion 31, the cold air can be discharged through the non-target blowing portion 32.

Further, in the present embodiment, the air switching portion 40 has a flat plate shape configured to rotate on the opening plate 102 and switch between the cold air supply state and the warm air supply state by rotating. Since the air switching portion 40 has a flat plate shape, a thickness of the air switching portion 40 in a direction from the blower 10 toward the blowing duct 30 can be decreased.

Further, in the present embodiment, the blower 10 includes the centrifugal fan 11 that sends the air toward the evaporator 13 and the condenser 12 simultaneously. Since the centrifugal fan 11 sends the air toward the evaporator 13 and the condenser 12 simultaneously, it is not necessary to adjust the flow of the air between the centrifugal fan 11 and the evaporator 13 and between the centrifugal fan 11 and the condenser 12. Accordingly, the structure of the air-conditioner 2 can be simplified.

In the present embodiment, the evaporator 13 and the condenser 12 are arranged so as to surround the centrifugal fan 11 when viewed in the direction of the rotation shaft of the centrifugal fan 11. Since the evaporator 13 and the condenser 12 surround the centrifugal fan 11, a thickness in the direction of the rotation shaft of the centrifugal fan 11 can be decreased.

Further, in the present embodiment, the section in which the evaporator 13 is provided and the section in which the condenser 12 is provided are partitioned with each other when viewed in the direction of the rotation shaft of the centrifugal fan 11. Since the evaporator 13 and the condenser 12 do not overlap each other in the direction of the rotation shaft of the centrifugal fan 11, the thickness in the direction of the rotation shaft of the centrifugal fan 11 can be decreased.

The present embodiment has been described with reference to specific examples above. However, the present disclosure is not limited to these specific examples. Those skilled in the art appropriately design modifications to these specific examples, which are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

What is claimed is:

1. An air conditioner, comprising:
    a blower unit configured to blow cold air and warm air simultaneously;
    a blowing duct including
        a target blowing portion through which air is sent to a space that is an air-conditioning target, and
        a non-target blowing portion through which the air is sent to a space that is not an air-conditioning target, and
    an air switching portion configured to switch the airs sent to the target blowing portion and the non-target blowing portion, wherein
    the air switching portion is configured to switch between
        a cold air supply state in which the cold air is sent to the target blowing portion while the warm air is sent to the non-target blowing portion, and
        a warm air supply state in which the warm air is sent to the target blowing portion while the cold air is sent to the non-target blowing portion, the blower unit includes an evaporator and a condenser constituting a refrigeration cycle, the cold air is air having passed through the evaporator configured to evaporate the refrigerant, the warm air is air having passed through the condenser configured to condense the refrigerant, the air switching portion is configured to switch between the cold air supply state in which the cold air is sent to the target blowing portion by opening a path between the evaporator and the target blowing portion and by closing a path between the evaporator and the non-target blowing portion, while the warm air is sent to the non-target blowing portion by opening a path between the condenser and the non-target blowing portion and by closing a path between the condenser and the target blowing portion, and the warm air supply state in which the cold air is sent to the non-target blowing portion by opening the path between the evaporator and the non-target blowing portion and by closing the path between the evaporator and the target blowing portion, while the warm air is sent to the target blowing portion by opening the path between the condenser and the target blowing portion and by closing the path between the condenser and the non-target blowing portion, the blower unit includes an opening plate having a cold air opening through which the cold air supplied from the evaporator flows out, and a warm air opening through which the warm air supplied from the condenser flows out, the air switching portion includes an opening portion configured to open the path between the target blowing portion or the non-target blowing portion and the evaporator or the condenser, and a closing portion configured to close the path between the target blowing portion or the non-target blowing portion and the evaporator or the condenser, the air switching portion has a flat plate shape and is configured to rotate along the opening plate, and the air switching portion switches between the cold air supply state and the warm air supply state by rotating.

2. An air conditioner, comprising:

a blower unit configured to blow cold air and warm air simultaneously;

a blowing duct including an target blowing portion through which air is sent to a space that is an air-conditioning target, and a non-target blowing portion through which the air is sent to a space that is not an air-conditioning target, and an air switching portion configured to switch the airs sent to the target blowing portion and the non-target blowing portion, wherein the air switching portion is configured to switch between a cold air supply state in which the cold air is sent to the target blowing portion while the warm air is sent to the non-target blowing portion, and a warm air supply state in which the warm air is sent to the target blowing portion while the cold air is sent to the non-target blowing portion, the blower unit includes an evaporator and a condenser constituting a refrigeration cycle, the cold air is air having passed through the evaporator configured to evaporate the refrigerant, the warm air is air having passed through the condenser configured to condense the refrigerant, the blower unit includes a fan configured to simultaneously send the air to the evaporator and the condenser, the fan is a centrifugal fan, and the evaporator and the condenser are arranged to surround the fan when the fan is viewed in a direction of a rotation axis of the fan.

3. The air conditioner according to claim 2, wherein a section in which the evaporator is provided and a section in which the condenser is provided are partitioned from each other when the fan is viewed in the direction of the rotation axis of the fan.

* * * * *